Patented Feb. 17, 1931

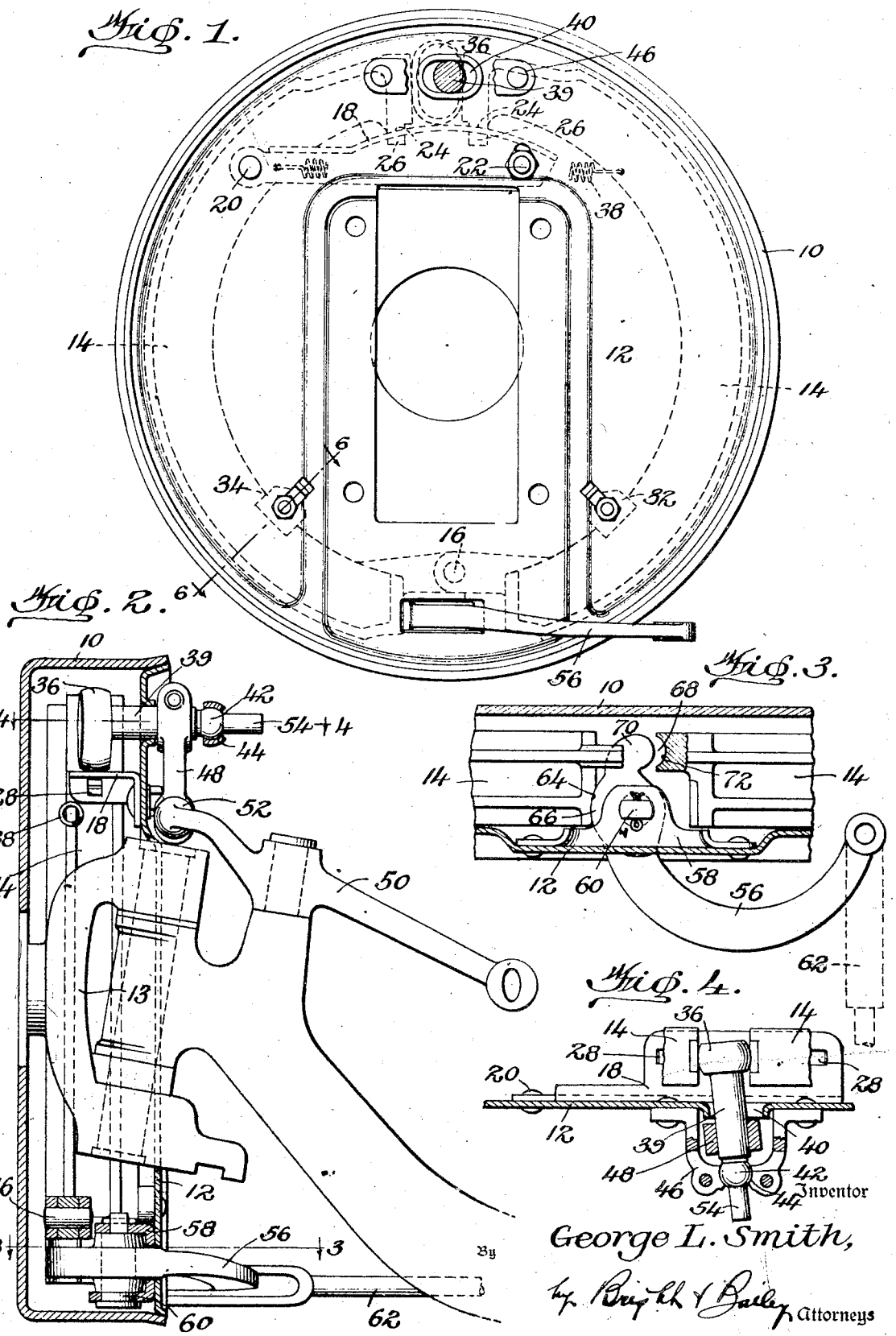

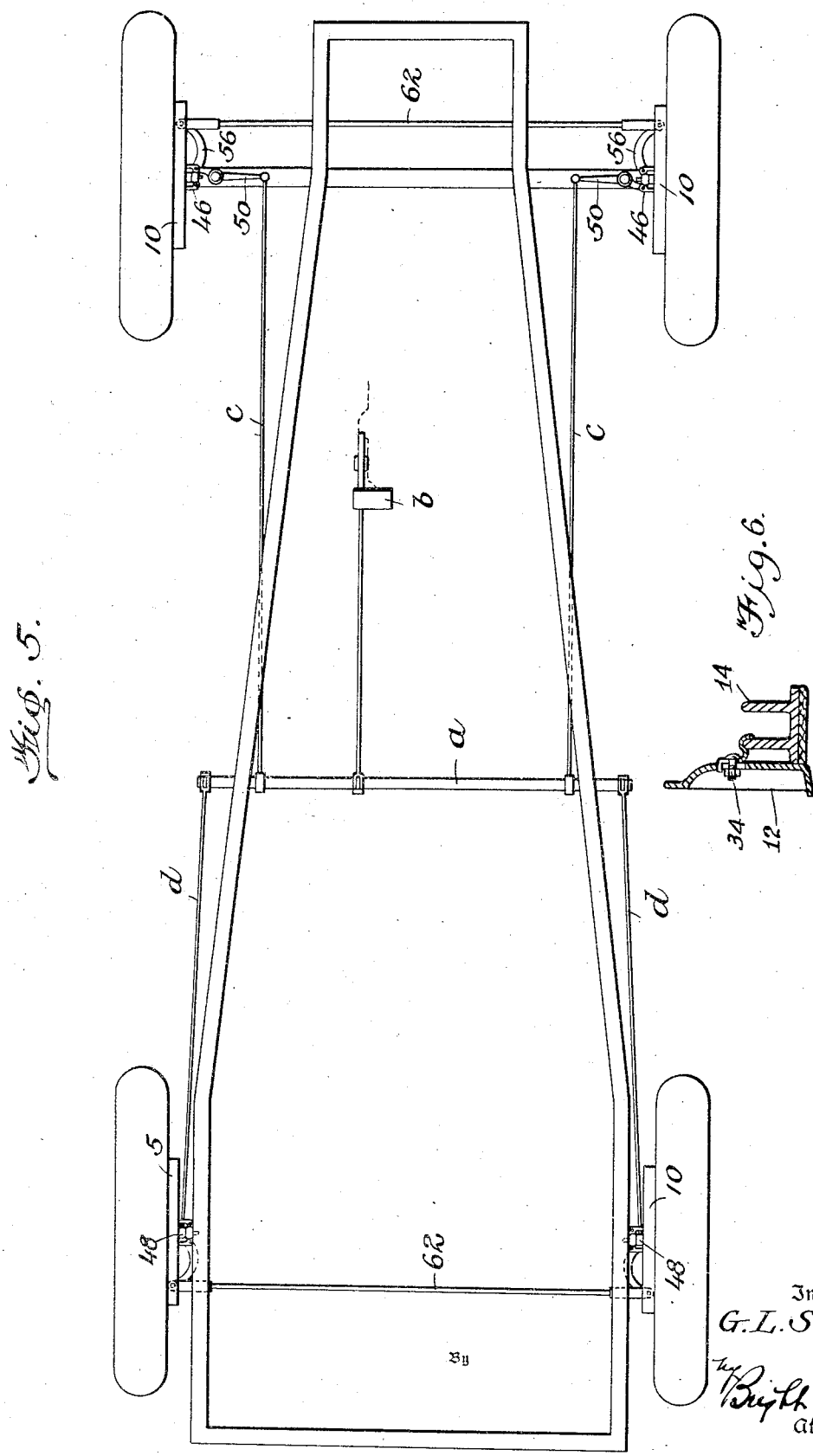

1,792,773

UNITED STATES PATENT OFFICE

GEORGE L. SMITH, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA.

BRAKE MECHANISM

Application filed August 28, 1928. Serial No. 302,574.

My invention relates to vehicle brake mechanisms of the internal expanding shoe type, and has particular reference to the equalization of the braking effects of a pair of such brakes in a similar manner to that described and claimed in my Patent 1,440,842 of January 2, 1923.

While the principles of equalization are no different for shoe brakes than for band brakes, the method of applying these principles is manifestly considerably different. Shoe brakes are usually applied by a cam and it is therefore necessary to design a cam which will not only expand the shoes, but which will compensate for unequal wear of lining on the shoes and also increases the brake pressure should the shoes rotate in one direction and decrease the brake pressure should they rotate in the opposite direction. This involves a cam so mounted that it will follow the shoes as they rotate.

Furthermore the brake anchoring mechanism must not only permit the right and left brakes to rotate an equal amount, but in opposite directions when braking ahead motion of the vehicle but also to prevent any such rotation when braking backward movement of the vehicle. Thus the cam above described will operate with the anchorage specified to (a) Expand the shoes under all conditions;

(b) Expand and compensate for unequal wear of brake lining when arresting rearward motion of the vehicle;

(c) Expand, compensate for wear, and vary the pressure as necessary to produce equal braking effects when arresting forward movement of the vehicle.

In addition to the above I desire to produce a shoe brake free to expand into the drum at all points, so that the gap between the two halves of a shoe may be reduced to a minimum and more wearing surface be obtained.

In the drawings, wherein like characters of reference denote corresponding parts in the different views:—

Figure 1 is a view in elevation showing my present invention incorporated in a brake mechanism in which the expanding shoe device is permitted to partake of limited rotary movement to adapt a pair of such brake mechanisms for connection by a braking effect equalizing mechanism of the type disclosed in my aforesaid patent;

Figure 2, a central, vertical, transverse section through the mechanism illustrated in Figure 1;

Figure 3, a detail section on the line 3—3 of Figure 2;

Figure 4, a detail section on the line 4—4 of Fig. 2;

Figure 5, a diagrammatic representation of a braking system of an automobile embodying my invention, and Figure 6, a section on the line 6—6 of Figure 1.

Referring to the drawings in detail 10 designates the brake drum adapted to be mounted in the usual manner on a wheel (not shown) and 12 the backing plate closing the open end of drum and mounted on the steering knuckle 13. The brake shoe is composed of two halves 14, 14 pivoted to each other, but not to the backing plate, by the hinge pivot 16. When not in use the shoe is carried by the backing plate in the following manner.

A support 18 is pivoted to the backing plate at the pivot 20 and is clamped at the other end by a bolt 22. A slotted opening for this bolt permits the support to be raised or lowered about the pivot 20 to adjust the shoe to the desired position. The toes 24, 24 rest on the support and carry extensions 26, 26 extending into slots 28 in the flange of the support to act as side guides, but permitting rotary movement of the shoe. At the points 32 and 34 other guides or adjusters are fitted to maintain proper running clearance of the shoe with its drum abreast these points.

The cam 36 rides between the ends of the two halves of the shoe in the usual way and pressure on this cam is maintained by a suitable brake release spring 38. The cam 36 is mounted on or forms part of a shaft 39 which passes through a horizontally elongated slot 40 in the backing plate and terminates in a ball 42. This ball is mounted in a socket 44 in a bracket 46 securely mounted on the backing plate 12. A lever 48 is secured to the shaft 39 for rotating the latter. A lever 50 is shown with a ball end 52 for pressing against a flat on the lower end of lever 48. A pull on the long arm of lever 50 will press the ball 52 against the lever 48 and thus cause the cam to operate. But the lever 48 is offset from the ball 42—in this case towards the cam, since the ball 52 pushes on the lever 48—so that forward rotation of the brake shoe would ease up on the cam pressure by swinging it and the lever 48 away from the ball 52. The action of ball 52 when pressing against lever 48 is both to swing and rotate shaft 39 and in operation the position of this shaft will be controlled by the position of the shoes as determined both by wear of the lining and by rotation of the shoes as necessary to produce equalization of the braking effects of the brakes. The brake anchoring mechanism consists of bell cranks and a cross rod connecting them, but so associated with the shoes that the bell-cranks control the rotation only, but do not in any way furnish a support to the shoe in a radial direction.

The bell-crank 56 is pivoted to the backing plate by a bracket 58 and pivot pin 60. The cross rod is shown as 62 connecting the long arm of the bell-crank on one side to that of the one (not shown) on the other side of the vehicle. The brake shoe is shown in backing position as the face 64 of the rear half of shoe is bearing against the flange 66 of the bell-crank, so that any braking force exerted by the face 64 will be carried through to the backing plate without producing any rotative force on the bell-crank 56. Therefore, the rod 62 carries no load when braking rearward motion of the vehicle.

In braking ahead motion of the vehicle the forward half of the shoe is rotated (clockwise in Fig. 1) closing gap 68, Fig. 3, and the braking load then builds up in the short arm 70 of the bell-crank through contact with the face 72. This braking load naturally places the rod 62 in tension with the result that each brake pulls against the other. It is easy to see that in such case the brake exerting the greater retarding force will rotate with its drum a little way and cause the opposite brake to rotate in the reverse direction. This rotative action in turn swings the cam and its shaft 39 away from the ball 52 in the case of the brake exerting the greater braking force thus easing off the braking pressure and on the opposite side the reverse action will take place to increase the braking pressure of the weaker brake until a balance of braking action is obtained.

The faces 64 and 72 permit the shoe to travel towards the drum so that brake pressure can be increased at the anchorage. This permits a smaller gap between the two halves of the shoe and increases the braking surface in contact with the drum.

In Figure 5 I have shown a complete brake system constructed in accordance with my invention and wherein $a$ is the brake shaft which is operated through connection with a pedal $b$. Connections $c$ extend forwardly from this brake shaft to the levers 50, respectively, and other connections $d$ extend rearwardly from said brake shaft to the lever 48 associated with the cam device previously described. Of course it will be apparent that in connecting the brake shaft $a$ with the rear brake the lever 50 is not necessary. The other parts appearing in this diagrammatic view are numbered in accordance with the designations of Figures 1, 2, 3 and 4.

I claim:

1. An internal brake comprising a brake drum, an expansible brake shoe within the drum, means for expanding said shoe and an anchoring mechanism independent of said expanding means rigidly anchoring said shoe when the drum is rotating in one direction and yieldably anchoring said shoe when said drum is rotating in the opposite direction.

2. An internal brake comprising a brake drum, an expansible brake shoe within said drum comprised of two segmental members connected together, and an anchoring mechanism comprising a non-yieldable abutment for engagement with one segmental member and a yieldable abutment for engagement with the other segmental member of said brake shoe.

3. An internal brake comprising a brake drum, an expansible brake shoe within the drum, means for expanding said shoe and an anchoring mechanism independent of said expanding means yieldably anchoring said shoe against rotation with said drum the yielding of said anchoring mechanism causing a reduction in the expanding action of said shoe expanding means.

4. An internal brake comprising a brake drum, an expansible brake shoe within the drum, means for expanding said shoe comprising a cam, a shaft carrying said cam at its free end and mounted for rotation and swinging movement about a fixed point adjacent its other end and a lever for rotating said shaft laterally offset from said fixed point, and an anchoring mechanism independent of said expanding means yieldably anchoring said shoe against rotation with said drum, the yielding of said anchoring mechanism causing a reduction in the expanding action of said shoe expanding means.

5. In combination, duplicate internal expanding brakes each including a brake drum, an expansible shoe device within the drum, means for expanding said shoe device comprising a cam, a shaft carrying said cam and mounted for rotation and swinging movement about a fixed point, a lever for rotating said shaft laterally offset from said fixed point, means common to said levers for simultaneously operating said shoe expanding devices, an anchoring mechanism for each brake independent of its related shoe expanding device yieldably anchoring its related shoe device against rotation with the drum, and a connection between said anchoring mechanisms whereby rotation of one brake device with its drum will operate through the connected anchoring mechanisms to rotate the other shoe device in an opposite direction to thereby maintain the torque on the two brakes substantially equal.

In testimony whereof I hereunto affix my signature.

GEORGE L. SMITH.